United States Patent [19]

Scott et al.

[11] Patent Number: 4,501,184
[45] Date of Patent: Feb. 26, 1985

[54] CUTTING TOOL WITH IMPROVED DEPTH CONTROL

[75] Inventors: Lewis A. Scott, Lake Oswego; Duane M. Gibson, Milwaukie, both of Oreg.

[73] Assignee: Omark Industries, Inc., Milwaukie, Oreg.

[21] Appl. No.: 489,860

[22] Filed: Apr. 29, 1983

[51] Int. Cl.³ .................. B27B 33/08; B27B 33/12; B27B 33/14
[52] U.S. Cl. ............................. 83/834; 83/839
[58] Field of Search ................. 83/839-845, 83/833-835, 855, 830

[56] References Cited

U.S. PATENT DOCUMENTS

| | | | |
|---|---|---|---|
| 218,184 | 8/1879 | King | 83/839 X |
| 352,004 | 11/1886 | Richards | 83/840 |
| 458,120 | 8/1891 | Rogers et al. | 83/842 |
| 786,103 | 3/1905 | Cummings et al. | 83/842 |
| 2,964,078 | 12/1960 | Proctor | 83/839 X |
| 2,976,900 | 3/1961 | Mills | 83/834 |
| 3,561,086 | 2/1971 | Milewski et al. | 83/840 X |
| 4,082,128 | 4/1978 | Barke et al. | 144/230 |
| 4,432,264 | 2/1984 | Scott | 83/855 X |

Primary Examiner—Frank T. Yost
Attorney, Agent, or Firm—Robert L. Harrington

[57] ABSTRACT

A cutting tool for use in applications wherein a kerf is formed during the cutting operation. The cutting tooth is formed on the cutting tool including a rearwardly angled inner relief surface against which the material being cut is impacted. A secondary surface intersects the inner relief surface and extends forwardly of the point of intersection at an angle relative to the direction of cut that is oppositely directed but generally equal to the inner relief surface. The force of the material being cut that is deflected onto the secondary surface is outwardly directed and counterbalances the inwardly directed force imparted onto the inner relief surface.

8 Claims, 7 Drawing Figures

4,501,184

CUTTING TOOL WITH IMPROVED DEPTH CONTROL

FIELD OF INVENTION

This invention relates to kerf generating cutting tools having cutting teeth, examples of which are circular saw blades, saw chain and the like, and more particularly it relates to means for controlling the depth of cut of the cutting teeth.

HISTORY OF INVENTION

Many concepts and ideas have developed over the years relating to the elements in a cutting tool that control the depth of cut. Consider that the cutting edge of a cutting tooth is designed to engage and penetrate a work piece. This is accomplished by providing an angled relief surface on the underside of the cutting edge (the inner relief surface). The driving force of the tool is deflected by the resistance of the material being cut acting against the angled relief surface to create a force vector inward to the work piece. The problem that develops is the need to control the depth of that penetration. A cutting tool that cuts too aggressively (i.e. sinks too deeply into the work piece) will cause the cutting action to be rough and potentially harmful to the equipment, and should the cutting teeth grab or lock in the work piece, it will produce a reactive force on the tool that is dangerous to the operator (referred to as kickback).

Altering the angle of the inner relief surface is not a total solution. If the cutting tooth is going to cut it has to be designed to seek increased depth. Thus secondary factors have to be introduced to offset the increased-depth seeking force when the desired depth of cut is achieved. In a saw chain, a non-cutting element referred to as a depth gage is commonly positioned on the cutter link in front of the cutting edge. The depth gage controls the depth of cut in part but it has not provided the ultimate solution. The chips that are formed during the cutting operation must be allowed to escape and thus the location of the depth gage has to be somewhat spaced from the cutting edge. Such spacing inhibits the ability of the depth gage to control the depth of cut and kickback although reduced, is not eliminated.

Another form of depth control is provided by the top surface of the cutting tooth, i.e. the outer relief surface of the tooth immediately following the cutting edge. By forming this surface so that it is close to being parallel with the cutting surface, a limiting effect is achieved. This outer surface pushes against the bottom of the kerf and is very effective in preventing too great a penetration of the cutter. However, it also interferes with cutting efficiency and a slight wearing of the edge quickly reduces cutting ability so that frequent sharpening is required.

BRIEF DESCRIPTION OF INVENTION

The present invention is believed to provide a superior depth control feature for a kerf generating cutting tool. Briefly, a gullet is formed preceeding the cutting tooth which provides a secondary surface that intersects the inner relief surface at the point of desired cutting depth. This secondary surface is angled outwardly and forwardly relative to the work piece at an angle similar to the inner relief surface but oppositely directed. The inner relief surface and secondary surface cooperate to impact and direct the material being cut by the cutting edge. Such impact on the secondary surface produces a lifting action that offsets the aggressiveness of the cutting edge when the desired depth of cut is achieved, i.e. as determined by the mass of the material being cut.

DETAILED DESCRIPTION AND DRAWINGS

The invention and the preferred embodiments thereof will be more fully appreciated by reference to the following detailed description and drawings wherein.

Figure 1:
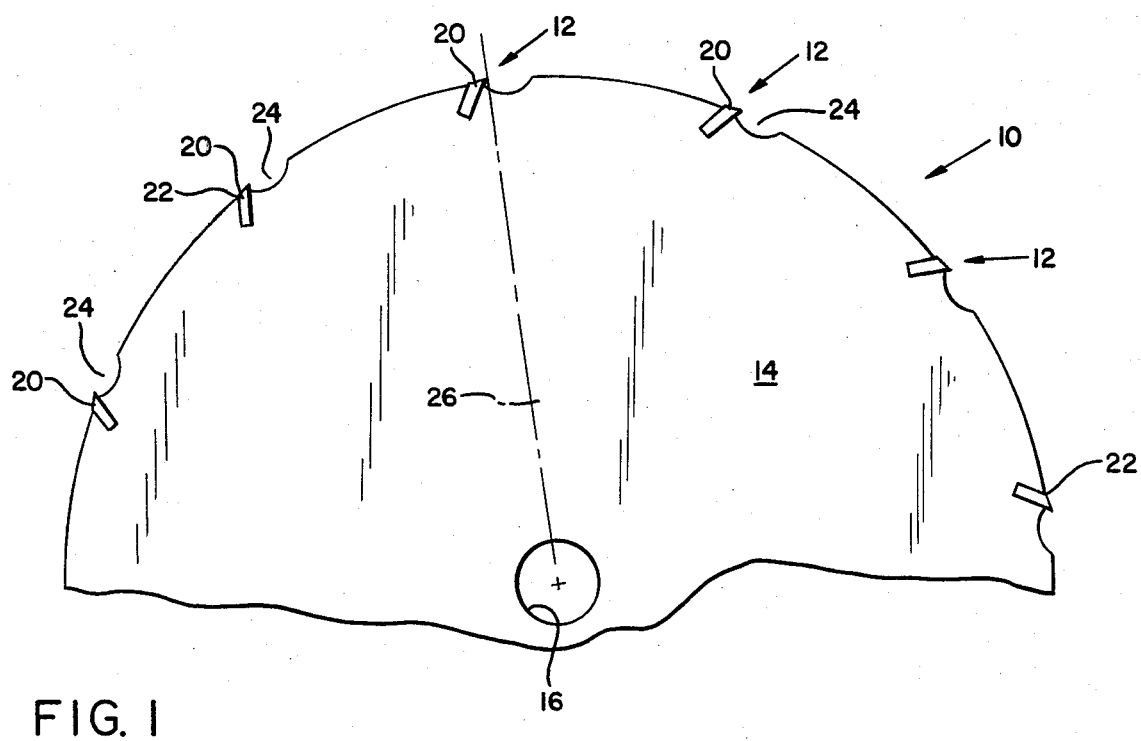
FIG. 1 is a portion of a circular saw blade in accordance with the present invention.

Referring to FIG. 1 of the drawings, a circular saw blade 10, consists of a circular, flat, steel disc 14 including a center opening 16 which allows the blade to be mounted on the arbor of a sawing machine (not illustrated). Cutters 12, provided on the periphery of the disc 14, include inserts 20 of a hard material, e.g. carbide or hardened steel, that are press fit or otherwise affixed within slots 22 at designated positions on the periphery of the blade, and by the provision of relief gullets 24 preceding the inserts. (The elements that cooperate to effect the cutting performance of a cutting tooth are hereafter collectively referred to as a "cutter").

Figure 2:
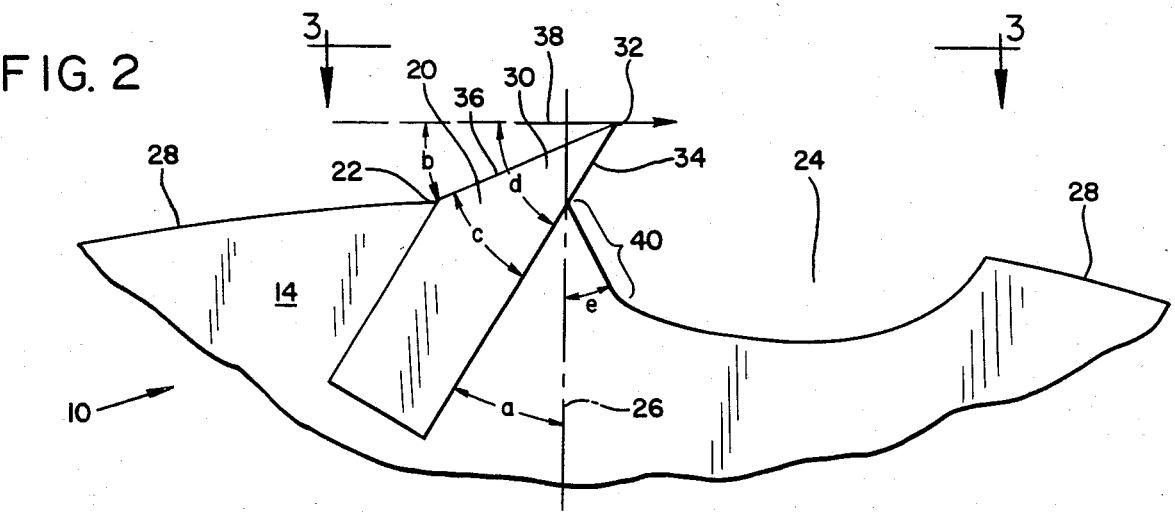
FIG. 2 is an enlarged view of the cutting elements of the saw blade of FIG. 1.
Figure 3:
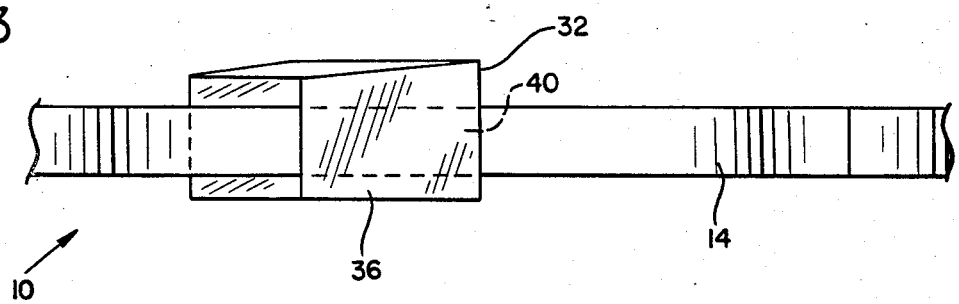
FIG. 3 is a top view as taken on lines 3—3 of FIG. 2.

Referring now to FIG. 2, the slots 22 are formed at an angle "a" to the radius 26 that is preferably about 30°. The slots have a width and depth sufficient to accomodate the cutter inserts 20. As indicated, the inserts 20 are affixed in position as by press-fitting, brazing or the like. The portions of the cutter inserts that project outwardly of the periphery 28 of the disc 14 are referred to as cutting teeth 30 and the outermost edges as the cutting edges 32. The inner relief surface 34 (also referred to as the forward surface) and the outer relief surface 36 (also referred to as the rear surface) of the cutting teeth are angled relative to a designated cutting direction indicated by line 38 which in the case of the circular saw blade is perpendicular to the radius 26 of the blade. As will be explained hereafter, the angle between the inner relief surface 34 and the designated cutting direction 38 determines the aggressiveness of the cutting element, whereas the angle between outer relief surface 36 and the designated cutting direction is established to avoid interference of surface 36 with the cutting function of the cutting tooth, i.e. by the surface 36 pushing against the bottom of the kerf.

It has been determined that the angle "b" between the outer relief surface 36 and cutting direction 38 is desirably at least 10° and as great as 20°. The included angle "c" between the inner relief surface 34 and the outer relief surface 36 of the cutting tooth 30 is kept as small as practical. Minimizing the angle "c" will allow the cutting tooth to maintain its cutting capability without sharpening much longer than will a greater angle. However, the cutter is subjected to severe forces and to prevent breakage of the cutter it has been determined that this angle "c" is preferably at least 40° for materials presently known to be suitable for this purpose. It is also desirable to create a minimum angle "d" between the cutting direction 38 and leading surface 34 of the cutting tooth. However, this angle "d" is a summation of the angles "b" and "c" and is thus preferably from 50° to 60°. Note that the complementary angle "a", i.e. the angle between surface 34 and the radius 26 of the cutting blade is thus 30° to 40°. Note also that surface 34 is merely a continuation of the leading edge of the insert 20 which is angled relative to the radial line 26 by 30° and thus in the specific embodiment shown, angle "b" is 20° and angle "c" is 40° (resulting in a 60° angle between inner relief surface 34 and the cutting direction 38).

Preceding the cutter 20 is a scallop-shaped gullet 24. The purpose of the gullet is to provide an escape for the chips. The configuration of the gullet however, is material to controlling the depth of penetration. Section 40 of the gullet 24 is particularly significant in this regard and provides a secondary surface that intersects inner relief surface 34 at the desired depth of cut and preferably would be generally the same length as inner relief surface 34. Section 40 is disposed at an angle "e" relative to radial line 26 which is similar to but oppositely to that of inner relief surface 34, i.e. 30°. Otherwise the configuration of gullet 24 is developed to allow adequate escape of the chips. The point where the gullet 24 intersects the periphery of the blade is sufficiently close to the cutting edge 32, so that the periphery 28 provides a reference for the work piece, i.e. it maintains a relative position between the work piece and the blade.

Figure 4:
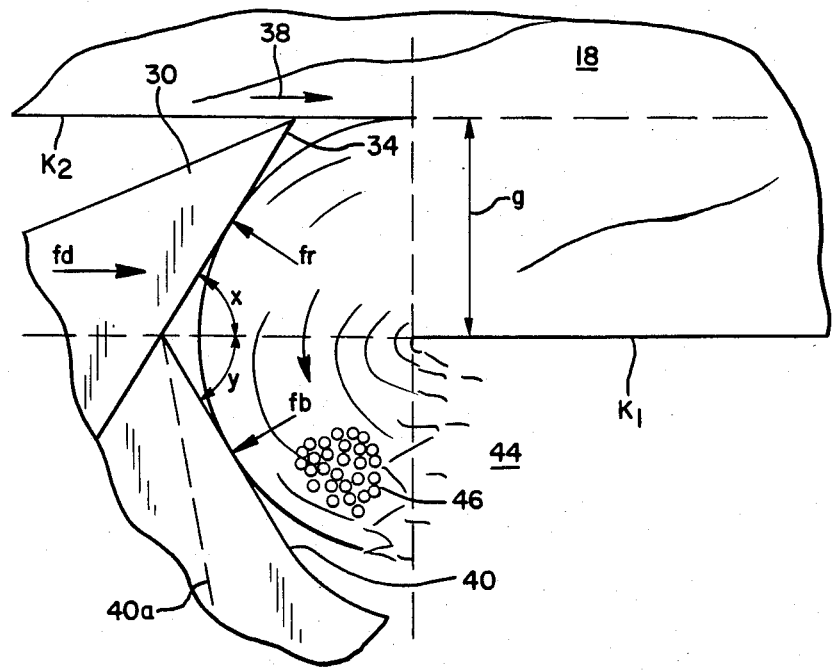
FIG. 4 is a further enlarged view of the cutting elements illustrating the cutting action.
Figure 5A:
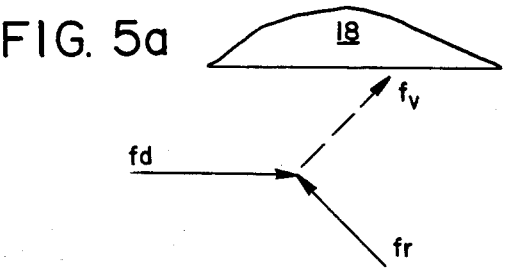
FIGS. 5a and 5b are diagrams of the resultant forces acting on the cutting tooth of FIG. 4.
Figure 5B:
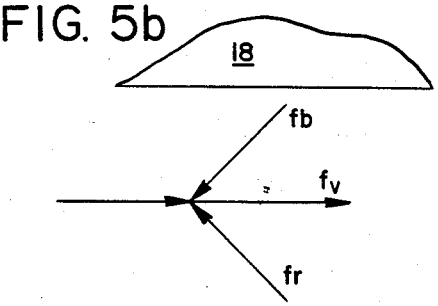

Reference is now made to FIGS. 4 and 5. FIG. 4 is an enlarged view of the cutting tooth 30 and is shown cutting into a work piece 18, e.g. a block of wood. Arrow $F_d$ represents the driving force which drives the cutter through the work piece 18. As the cutting tooth 30 passes through the work piece 18 it strips away a section of the wood represented by the change in kerf bottom from $K_1$ preceding the cutter to $K_2$ after passage of the cutting tooth. This change in kerf depth is the depth of cut achieved by the cutter tooth and is desirably equivalent to the exposure of the cutter tooth 30 above the periphery 28 of the blade. The section of wood that is stripped away becomes wood chips 44 and in a cross cutting operation is comprised of crosswise-oriented wood fibers 46.

As illustrated in FIG. 4, the wood strip initially engages the front relief surface 34 of the cutting tooth 30 which, due to its angle, turns the strip (which is being broken into the chips 44) down against secondary surface 40 of the gullet 24. Secondary surface 40, in turn, due to its angle, directs the strip or chips 44 forwardly to be carried out of the kerf. It is to be understood that surface 40 (as might surface 34) may be slightly curved and quite acceptably achieve the angular deflection desired. The effect of the coordinating surfaces 34 and 40 are believed to provide first, the penetration of the cutting tooth that is desired for initial entry into the work piece, and then the balancing of forces to maintain the desired depth of cut.

Reference is made to the diagram of FIG. 5a which illustrates the forces applied during engagement of the cutting edge into the work piece and the subsequent penetration of the cutter into the work piece prior to achieving the desired depth of cut. Note that the severed portion of the work piece 18 (the wood strip) engaging the angled inner relief surface 34 develops a resistance force $F_r$ that is angularly directed inward relative to the work piece. The driving force $F_d$ overcomes the resistance of $F_r$ but is angularly deflected as illustrated by the resultant force vector $F_v$. The cutting edge thus seeks deeper and deeper penetration.

As the thickness of the wood strip or chips increases, a greater force $F_b$ is impacted onto surface 40. This force rises sharply at the point when the material thickness (distance between $k_1$ and $k_2$) reaches or exceeds the throat opening defined by the kerf bottom and side walls and the inner relief surface and secondary surface. At that point the material must become compressed by surface 40 in order to make the turn required by the deflecting surfaces 34 and 40. The force $F_b$ acting against surface 40 is angularly directed outwardly relative to the work piece and offsets or balances the inwardly directed force $F_r$ acting against surface 34. Diagram 5b illustrates the application of resistant forces $F_r$ and $F_b$ against the dominant driving force $F_d$ to develop a balanced force vector $F_v$.

It will be appreciated that the above explanation of the resultant effect of the combined surfaces 34 and 40 is theoretical in nature and as such is not to be construed as a limitation of the invention. Nevertheless, in tests that have been run, it has been determined that it is important to maintain a similar angular orientation of the surfaces 34 and 40 relative to the direction of cut, if the depth of cut is to be maintained at the approximate height of exposure of the cutting tooth 30. (This similarity of angular orientation will be further understood by referring to the extension of a line from $K_1$ through the intersection of surfaces 34 and 40 in FIG. 4, which line is parallel to the direction of cut 38, and noting that angles "x" and "y" are similar. Opening the angle of surface 40 relative to the surface 34, i.e. shown as dotted line 40a, will result in the cutter penetrating deeper into the work piece, whereas closing that angle has the opposite effect.

ALTERNATE EMBODIMENTS

Figure 6:
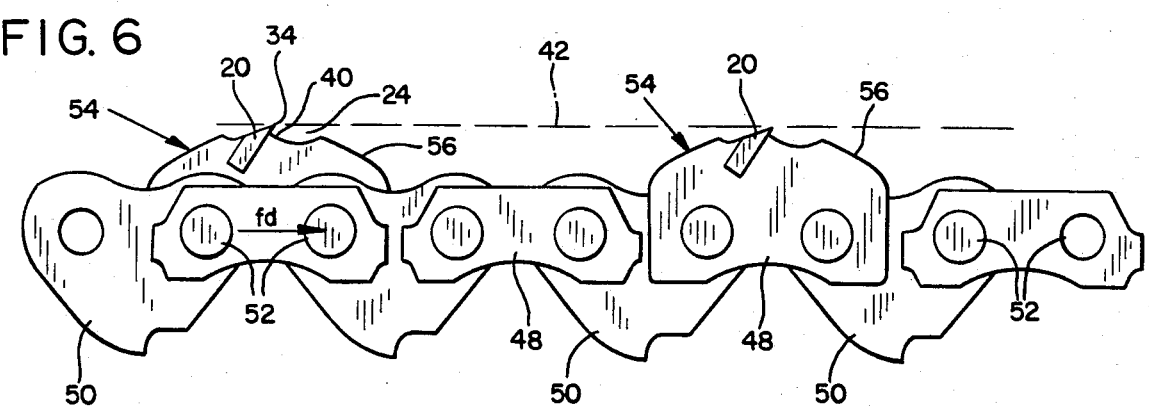
FIG. 6 is an alternate embodiment of the invention.

The above described cutter is believed adaptable to any wood cutting tool wherein a kerf is being formed such as to require a chip relieving gullet. For example, reference is made to FIG. 6 which illustrates a cutting chain for use on a chain saw. In the case of the cutting chain the reference line around which the angles of the surfaces 34 and 40 are developed is a line 42 that is the designated cutting direction determined by the driving force $F_d$ generated through the rivets 52. Side links 48, drive links 50 and rivets 52 are all components typical of existing saw chain. The cutter link 54 is provided with a leading edge 56 that is cammed to prevent hooking and to establish a reference plane. The depth of cut is controlled by the relationship of the front relief surface 34 of the cutter insert 20 in combination with the secondary surface 40 of the gullet 24. In every respect (except for the circular drive) the cutting action of the cutting chain imitates that of the cutting blade 10 and further explanation is believed to be unnecessary.

As heretofore explained, this invention is believed to achieve a major breakthrough in the development of a depth controlling feature that does not impact on the cutting tooth design. This concept can be beneficially applied to a variety of cutting tools and the above described embodiments are illustrative only. The scope of the invention is to be determined by reference to the claims appended hereto.

We claim:

1. A cutting tool utilizing chip flow for controlling depth of cut for use in applications wherein a kerf is formed, comprising; a cutting tooth having a designated cutting direction, a cutting edge on said cutting tooth and outer relief and inner relief surfaces angled relative to the cutting direction rearwardly of the cutting edge which create a force during a cutting operation that urges increasing depth of cut, and a secondary surface intersecting the rearwardly angled inner relief surface at the desired depth of cut and extending forwardly from said intersection a distance at least equal to the length of the inner relief surface, the angles of the inner relief surface and the secondary surface being generally equal but oppositely directed relative to the cutting direction to thereby create a restrictive throat whereby chips cut by the cutting edge are impacted on the secondary suface for countering the force urging increasing depth of cut.

2. A cutting tool as defined in claim 1 wherein a gullet is formed in the cutting tool preceding the cutting tooth, and said secondary surface is provided by a portion of the edge of the gullet.

3. A cutting tool as defined in claim 2 wherein the outer relief surface is angled relative to the designated cutting direction at least 10° and not greater than 20° and the included angle between the inner and outer relief surfaces is at least 40° and the angle between the inner relief surface and the designated cutting direction is not greater than 60°.

4. A cutting tool as defined in claim 3 wherein an element precedes the cutting tooth and provides a reference for a work piece being cut.

5. A cutting tool as defined in claim 2 wherein the cutting tool is formed on the periphery of a circular saw blade.

6. A cutting tool as defined in claim 2 wherein the cutting element is formed in the cutter link of a saw chain.

7. A cutting tool as defined in claim 2 wherein a slot is provided in the cutting tool, and a removable insert seated in the slot, a portion of the insert projected from the slot and said cutting tooth being formed from said projected portion.

8. A cutting tool as defined in claim 7 wherein the slot is angled rearwardly relative to the designated cutting direction equal to the desired angle of the inner relief surface whereby said inner relief surface is provided by the corresponding side of the cutter insert projected out of the slot.

* * * * *